United States Patent [19]

Kirk et al.

[11] Patent Number: 5,500,283
[45] Date of Patent: Mar. 19, 1996

[54] COATED HDPE FILM AND ITS METHOD OF MANUFACTURE

[75] Inventors: Kevin A. Kirk, Macedon; Leland L. Liu, Fairport; Jeffrey J. O'Brien, Walworth; Robert M. Sheppard, Fairport, all of N.Y.

[73] Assignee: Mobil Oil Corporation, Fairfax, Va.

[21] Appl. No.: 160,552

[22] Filed: Dec. 1, 1993

[51] Int. Cl.⁶ .................................................. B32B 7/12
[52] U.S. Cl. .......................... 428/349; 428/516; 428/518; 428/910; 264/176.1
[58] Field of Search ................................. 428/518, 516, 428/910, 349, 520; 264/176

[56] References Cited

U.S. PATENT DOCUMENTS

| | | | |
|---|---|---|---|
| 3,753,769 | 8/1973 | Steiner | 117/122 |
| 4,058,645 | 11/1977 | Steiner | 428/331 |
| 4,214,039 | 7/1980 | Steiner et al. | 428/414 |
| 4,439,493 | 3/1984 | Hein et al. | 428/414 |
| 4,447,494 | 5/1984 | Wagner, Jr. et al. | 428/349 |
| 4,865,908 | 9/1989 | Liu et al. | 428/248 |
| 4,870,122 | 9/1989 | Lu | 524/488 |
| 5,204,180 | 4/1993 | Nelson et al. | 428/518 |

FOREIGN PATENT DOCUMENTS

| | | | |
|---|---|---|---|
| 0148648 | 9/1982 | Japan | 428/518 |
| 140250 | 8/1983 | Japan | 428/518 |

*Primary Examiner*—Edith Buffalow
*Attorney, Agent, or Firm*—Alexander J. McKillop; Dennis P. Santini; Laurence P. Hobbes

[57] ABSTRACT

The invention relates to a coated film composition comprising:

a) a biaxially oriented high density polyethylene (HDPE) film comprising at least 50 wt. % of HDPE having a density of 0.960 or greater; and b) a coating which is derived from the group consisting of polyvinylidene chloride polymer or copolymer, acrylic acid polymer or copolymer, and polyvinyl alcohol polymer (PVOH); and its method of manufacture.

20 Claims, No Drawings

COATED HDPE FILM AND ITS METHOD OF MANUFACTURE

This invention is concerned with coated oriented high density polyethylene film having the utility of a packaging film.

BACKGROUND OF THE INVENTION

All polymeric films possess both good and bad characteristics. An organic polymer film that may be an excellent barrier film for excluding the transmission of oxygen and water vapor may be a poor film regarding flexibility, heat sealability, printability, appearance, etc. Polyethylene film, while excellent for structures such as grocery sacks or bread wrappers, is not an excellent packaging film for products such as, snack foods, etc. Polyethylene, in some applications lacks sufficient flavor/aroma barrier properties. Moreover, polyethylene lacks the ability to provide a peelable seal which is often required by food packagers.

It is an object of the present invention to present an oriented high density polyethylene coated for improved properties, especially relating to oxygen barrier, flavor/aroma barrier, and seal peelability.

SUMMARY OF THE INVENTION

The present invention is concerned with a coated film comprising:

a) a biaxially oriented high density polyethylene (HDPE) film comprising at least 50 wt. % of HDPE having a density of 0.960 or greater; and b) a coating which is derived from the group consisting of polyvinylidene chloride polymer or copolymer, acrylic acid polymer or copolymer, ethylene acrylic acid polymer or copolymer, and polyvinyl alcohol polymer (PVOH).

DETAILED DESCRIPTION OF THE INVENTION

As indicated above the film of the present invention comprises essentially a biaxially oriented high density polyethylene film and a coating which provides improved properties without significantly affecting water vapor transmission resistance. The film is preferably a biaxially oriented high density polyethylene film having a density of 0.960 or greater. Films of this type are disclosed in U.S. Pat. No. 4,870,122 issued to P. C. Lu, the disclosure of which is incorporated herein in its entirety. The HDPE film can be composed exclusively of a single HDPE resin, a mixture of HDPE resins, or of HDPE containing a minor proportion of up to about 10 wt. % microcrystalline wax. Films made with either a blend of HDPE resins or with microcrystalline wax reduce the splittiness of the film which manifests itself as a tendency of the film to break in the transverse direction (TD) during packaging on vertical, form, fill and seal (VFFS) machinery.

The blends of HDPE polymers can comprise two or more polymers all of which preferably have densities of 0.960 or greater. Blends of HDPE polymers advantageously comprise a major proportion of HDPE having a melt index of 0.6 to 1.2 and one or more polymers having a different melt index.

Terblends have been found particularly desirable. Suitable terblends generally comprise 50 to 98 weight percent, preferably 84 to 96 weight percent of HDPE having a density of 0.960 or higher and a melt index of greater than 0.5 to about 2.0; 1 to 25 weight percent, preferably 3 to 8 weight percent of HDPE having a density of 0.960 or greater and a melt index of 0.1 to 0.5; and 1 to 25 weight percent, preferably 3 to 8 weight percent, of HDPE having a density of 0.960 or higher and a melt index of greater than 2 to about 8. Preferably, the second and third HDPE polymers, which are minor components, are present in about equal amounts.

It is preferred that the HDPE films of this invention be biaxially oriented in an unbalanced manner. By this is meant that the HDPE is oriented to a degree of 1.25:1 to about 2:1 in the machine direction (MD) and to a degree of about 6:1 to about 12:1 in the transverse direction (TD). The HDPE can be coextruded with conventional heat-seal materials, e.g. Surlyn or EP copolymers.

Additives such as fillers, antioxidants, pigments, antistatic agents, slip agents, antitack agents and the like can be incorporated in the high density polyethylene film.

Coatings can be derived from any of the terpolymeric compositions disclosed in U.S. Pat. Nos. 3,753,769, and 4,865,908, the contents of which are incorporated by reference herein. These coating compositions contain as a film forming component a resin consisting essentially of an interpolymer of (a) from about 2 to about 15, and preferably from about 2.5 to about 6, parts by weight of an alpha-beta monoethylenically unsaturated carboxylic acid selected from the group consisting of acrylic acid, methacrylic acid, and mixtures thereof, and (b) from about 85 to about 98, and preferably from about 94 to about 97.5, parts by weight of neutral monomer esters, said neutral monomer esters preferably comprising (1) methyl acrylate or ethyl acrylate and (2) methyl methacrylate. These interpolymer compositions are further characterized by preferably comprising from about 30 percent to about 55 percent by weight of methyl methacrylate when said alkyl acrylate is methyl acrylate, and from about 52.5 percent to about 69 percent by weight of methylmethacrylate when said alkyl acrylate is ethyl acrylate. As more fully described infra, such coating compositions can be applied to the films herein in a variety of ways including in the form of ammoniacal solutions.

Similarly useful are copolymeric coating compositions prepared from the foregoing neutral monomer esters. These coating compositions are advantageously applied to the film laminates in the form of emulsions.

The coating can also be based on any of the known and conventional polyvinylidene chloride (PVDC) compositions heretofore employed as coatings in film manufacturing operations, e.g., any of the PVDC materials described in U.S. Pat. Nos. 4,214,039 and 4,447,494, both of which are incorporated herein by reference, preferably with prior application of a primer layer to enhance adhesion of the PVDC coating layer to the film surface to which it is applied. Commercially available PVDC latexes having a vinylidene chloride content of at least 50% and preferably from about 75% to about 92% may be employed. The PVDC can also be provided as a copolymer of vinylidenechloride and one or more other ethylenically unsaturated comonomers including alpha, beta ethylenically unsaturated acids such as acrylic and methacrylic acids; alkyl esters containing 1–18 carbon atoms of said acids, such as methylmethacrylate, ethyl acrylate, butyl acrylate, etc. In addition alpha, beta ethylenically unsaturated nitriles such as acrylonitrile and methacrylonitrile and monovinyl aromatic compounds such as styrene and vinyl chloride comonomers can be employed. Specific PVDC latexes contemplated comprise: 82% by weight vinylidene chloride, 14% by weight ethyl acrylate and 4% by weight acrylic acid. Alternatively a polymer latex comprising about 80% by weight vinylidene chloride, about 17% methyl acrylate and about 3% by weight methacrylic acid can likewise be employed.

The vinyl alcohol polymers which may be used as coatings can be any commercially available material. For example, Vinol 125, 99.3 +% super hydrolyzed polyvinyl alcohol, or Vinol 325, 98% hydrolyzed polyvinyl alcohol obtained from Air Products, Inc.

Before applying the coating composition to the appropriate substrate, the upper surface of the film is preferably treated to increase its surface energy and therefor insure that the coating layer will be strongly adherent thereto thereby reducing the possibility of the coating peeling or being stripped from the film. This treatment can be accomplished employing known techniques, such as, for example, film chlorination, i.e., exposure of the film surface to gaseous chlorine, treatment with oxidizing agents such as chromic acid, hot air or steam treatment, flame treatment and the like. Although any of these techniques is effectively employed to pretreat the film surface, a particularly desirable method of treatment is the so-called electronic treatment method which comprises exposing the film surface to a high voltage corona discharge while passing the film between a pair of spaced electrodes. After electronic treatment of the film surface, the coating composition is then applied thereto.

In applications where even greater coating-to-film adherence is desired, i.e., greater than that resulting from treatment of the film surface by any of the aforediscussed methods, an intermediate primer coating can be employed to increase the adherence of the coating composition to the film. In this case, the film is advantageously first treated by one of the foregoing methods to provide increased active adhesive sites thereon (thereby promoting primer adhesion) and to the thus treated film surface there is subsequently applied a continuous coating of a primer material. Such primer materials are well known in the prior art and include, for example, epoxy and poly(ethylene imine) (PEI) materials. U.S. Pat. Nos. 3,753,769 to Steiner, 4,0858,645 to Steiner and 4,439,493 to Hein et al., incorporated herein by reference, disclose the use and application of such primers. The primer provides an overall adhesively active surface for thorough and secure bonding with the subsequently applied coating composition and can be applied to the base film by conventional solution coating means, for example, by mating roller application.

The coating composition can be applied to the high density polyethylene film as a solution, e.g., one prepared with an organic solvent such as an alcohol, ketone, ester, etc. However, since the coating composition can contain insoluble, finely divided inorganic materials which are difficult to keep well dispersed in organic solvents, it is preferable that the coating composition be applied to the treated surface in any convenient and known manner, such as by gravure coating, roll coating, dipping, spraying, etc. The excess aqueous solution can be removed by squeeze rolls, doctor knives, etc.

The polyethylene film can be stretched in the machine direction, coated with the coating composition and then stretched perpendicularly in the transverse direction. In yet another embodiment, the coating can be carried out after biaxial orientation is completed.

The coating composition should be applied in such amount that there will be deposited upon drying a smooth, evenly distributed layer, generally on the order of from about 0.01 to about 0.2 mil thickness (equivalent to about 0.2 to 3.5 g per 1000 sq. in. of film). In general, the thickness of the applied coating is such that it is sufficient to impart the desired seal peelability, oxygen and water vapor barrier characteristics to the resulting film. Generally, the coating comprises 1 to 25 wt %, preferably 7 to 15 wt % of the entire coated film composition. The coating on the film is subsequently dried by hot air, radiant heat or by any other convenient means.

The total thickness of the polymer film of this invention is not critical and will be selected to meet particular service requirements. So, for example, when used in packaging, the total thickness of the oriented high density polyethylene as coated can be on the order of from about 0.3 to about 3 mils, with the polyethylene film representing about 95% of the total and the coating comprising the balance.

EXAMPLE 1

High density polyethylene resin (M6211) having a melt index of 1 and a density of 0.96, and a thickness of 1.15 mil was obtained from Oxychem of Houston, Tex. The film was oriented 1.2 times MD and 9 times TD. The crimp seal strength, water vapor transmission resistance, oxygen and flavor/aroma barrier were measured and are set out below in the Table.

EXAMPLE 2

The high density polyethylene film of Example 1 was coated after orientation with an ultra high barrier PVdC (Daran 8500 available from Hampshire Chemical of Lexington, Mass.). Coating was carried out by first corona treating, then priming with epoxy primer at approximately 0.15 g/1000in$^2$ (MSI). 100 parts (by weight) top coat (PVdC) was formulated with 3 parts M-21520 wax (Michelman carnauba wax) and 0.25 parts talc. Coating was carried out using a reverse direct gravure coater and was applied at about 2.8 g/1000 in$^2$. Both primer and top coat were dried by forced air, gas fired ovens. The crimp seal strength, water vapor transmission resistance, and oxygen barrier were measured and are set out below in the Table.

The resulting PVdC-coated product exhibited reduced WVTR and had extremely low oxygen transmission properties.

EXAMPLE 3

The high density polyethylene film of Example 1 was coated after orientation with acrylic coating available from Valspar Corp. of Pittsburgh, Pa. Coating was carried out by first corona treating, then priming with poly(ethylene imine) (PEI) primer. Acrylic top coat was formulated with 100 parts acrylic, 5 parts carnauba wax, 0.25 parts talc, 40 parts colloidal silica, and 4 parts Resinall 807, a rosin ester obtained from Resinall Corp., Stamford, Conn.

Coating was carried out using a reverse direct gravure coater and was applied at about 0.7 g/1000 in$^2$. Both primer and top coat were dried by forced air, gas fired ovens. The crimp seal strength, water vapor transmission resistance, and oxygen barrier were measured and are set out below in the Table.

The resulting acrylic-coated product exhibited a relatively high crimp seal strength and flavor/aroma barrier.

EXAMPLE 4

The high density polyethylene film of Example 1 was coated after orientation with ethylene acrylic acid coating (Michemprime 4983) available from Michelman, Inc. of Cincinnati, Ohio. Coating was applied in line between machine direction orientation and transverse direction orientation.

The aqueous coating, ethylene acrylic acid, was placed in a reverse direct gravure coater which had been installed between the MD orienter and the TD orienter of a semi-works scale orienter. High density core resin (OXYCHEM M 6211) was extruded through a three layer sheet die at 480° F., cast onto a cooling drum and quenched at 110° F. The core layer had co-extruded with it two skins, one on each side. The A layer consisted of 0.7 mil HDPE (OXYCHEM M6211), the C layer consisted of 0.7 mil thick terpolymer (Chisso 7820), available from Chisso of Japan. The total cast structure A/B/C was 12 mil thick. The cast co-extrusion was reheated to 220° F. in the machine direction orienter (MDO) and stretched 1.2 times in the machine direction, then corona treated on the A layer for improved surface wettability. The resulting 10 mil film web was then passed through the gravure coater and coated with the aqueous coating. The coated web was dried in the pre-heat zones of the transverse direction orienter (TDO) at 300° F., then stretched eightfold in the transverse direction at 250° F. and annealed at 235° F. The resulting biaxially stretched film was 1.15 mil thick and the coated film had properties reported in the Table below. Notably, the coated to coated seal strength was peelable and measured 400 g/in when crimped at 240° F.

The resulting coated product exhibited a relatively high crimp seal strength which is suitable for a peelable seal while maintaining water vapor transmission resistance and oxygen barrier properties similar to uncoated oriented high density polyethylene.

EXAMPLE 5

The high density polyethylene film of Example 1 was coated with high barrier polyvinylidene chloride coating. The coating was applied in line between machine direction orientation and transverse direction orientation.

An aqueous coating, polyvinylidene chloride emulsion (DARAN 8540™ obtained from W. R. Grace, Lexington, Mass.) was placed in a reverse direct gravure coater which had been installed between the MD orienter and the TD orienter of a semi-works scale orienter. High density core resin (OXYCHEM M 6211) was extruded through a three layer sheet die at 480° F., cast onto a cooling drum and quenched at 110° F. The core layer had co-extruded with it two skins, one on each side. The A layer consisted of 0.7 mil HDPE (Oxychem M- 6211), the C layer consisted of 0.7 mil thick polypropylene terpolymer (Chisso 7510). The total cast structure, A/B/C was 12 mil thick. The cast coextrusion was reheated to 220° F. in the machine direction orienter (MDO) and stretched 1.2 times in the machine direction, then corona treated on the A layer for improved surface wettability. The resulting 10 mil thick film web was then passed through the gravure coater and coated on the A layer with the aqueous coating. The coated web was dried in the preheat zones of the transverse direction orienter (TDO) at 300° F., then stretched eight times in the TD at 250° F. and annealed at 235° F. The biaxially stretched film measured 1.15 mil. The resultant coated film had properties reported below in the Table, notably improved resistance to oxygen transmission (TO$_2$ reduced from 129 to 6 cc/100in$^2$/day) and improved resistance to water vapor transmission (WVTR reduced from 0.22 to 0.19 g/100in$^2$/day). Improved flavor and aroma barrier results from the improved TO$_2$, PVdC being a good flavor and aroma barrier. Coated to coated film seals at 240° F. of 160 g/in represent a capability to provide peelable or "easy to open" seals.

TABLE

| EXAMPLE # | 1 | 2 | 3 | 4 | 5 |
|---|---|---|---|---|---|
| WVTR, g/100in$^2$, 24hr, 100° F., 90% RH (ASTM F 1249-89) | .18–.24 | .13 | 0.20 | 0.20 | 0.16–.22 |
| TO2 cc/100in2/24hr strength, g/in (ASTM D 3985-81) | >129 | 0.7 | >129 | >129 | 6 |
| Crimp seal strength g/in, 20psi, ¾ sec. at 240° F. | 1170 | 305 | 830 | 400 | 160 |
| Flavor/Aroma barrier | poor | excel. | good | — | good |

Although the present invention has been described with reference to preferred embodiments, it is to be understood that modifications and variations may be resorted to without departing from the spirit and scope of this invention. Such modifications and variations are considered to be within the purview and scope of the appended claims.

What is claimed is:

1. A coated film composition comprising:
   a) a biaxially oriented high density polyethylene (HDPE) film comprising at least 50 wt. % of HDPE having a density of 0.960 or greater; and
   b) a coating which is selected from the group consisting of polyvinylidene chloride polymer, polyvinylidene chloride copolymer, acrylic acid polymer, acrylic acid copolymer and polyvinyl alcohol polymer (PVOH).

2. The composition of claim 1 wherein said coating is derived from acrylic acid polymer.

3. The composition of claim 1 wherein said coating is derived from acrylic acid copolymer.

4. The composition of claim 3 wherein said acrylic acid copolymer is a copolymer of ethylene and acrylic acid.

5. The composition of claim 1 wherein said coating is derived from polyvinylidene chloride polymer.

6. The composition of claim 1 wherein said coating comprises 1 to 25 wt % of the composition.

7. The composition of claim 1 wherein said coating comprises 7 to 15 wt % of the composition.

8. A method of preparing a coated film which comprises coating a biaxially oriented high density polyethylene (HDPE) film comprising at least 50 wt. % of HDPE having a density of 0.960 or greater with a coating which is selected from the group consisting of polyvinylidene chloride polymer, polyvinylidene chloride copolymer, acrylic acid polymer, acrylic acid copolymer, and polyvinyl alcohol polymer (PVOH).

9. The method of claim 8 wherein said coating is derived from acrylic acid polymer.

10. The method of claim 8 wherein said coating is derived from acrylic acid copolymer.

11. The method of claim 10 wherein said acrylic acid copolymer is a copolymer of ethylene and acrylic acid.

12. The method of claim 8 wherein said coating is derived from polyvinylidene chloride polymer.

13. The method of claim 8 wherein said coating is derived from polyvinyl alcohol (PVOH).

14. The method of claim 8 wherein said coating comprises 1 to 20 wt % of the composition.

15. A method of preparing a coated film which comprises
   a) coating a machine direction uniaxially oriented high density polyethylene (HDPE) film comprising at least 50 wt. % of HDPE having a density of 0.960 or greater with a coating which is selected from the group consisting of polyvinylidene chloride polymer, polyvinylidene chloride copolymer, acrylic acid polymer, acrylic acid copolymer and polyvinyl alcohol polymer (PVOH); and b) orienting the resulting coated film in the transverse direction.

16. The method of claim 15 wherein said coating is derived from acrylic acid polymer.

17. The method of claim 15 wherein said coating is derived from acrylic acid copolymer.

18. The method of claim 15 wherein said coating is derived from polyvinylidene chloride polymer.

19. The method of claim 15 wherein said coating is derived from polyvinyl alcohol polymer (PVOH).

20. The method of claim 15 wherein said coating comprises 1 to 25 wt % of the composition.

* * * * *